United States Patent [19]

Jones et al.

[11] 4,120,405
[45] Oct. 17, 1978

[54] SPEAR-TYPE TRACTOR-ATTACHED HAY BALE PICKUP DEVICE

[75] Inventors: John B. Jones, College Grove; Robert W. Upton, Pulaski, both of Tenn.

[73] Assignee: Four Star, Inc., College Grove, Tenn.

[21] Appl. No.: 610,893

[22] Filed: Sep. 5, 1975

[51] Int. Cl.² ............................................. B65G 67/02
[52] U.S. Cl. ............................. 214/1 HH; 214/145 A
[58] Field of Search .............. 214/766, 145 R, 145 A, 214/774, 144, 131 A, 140

[56] References Cited

U.S. PATENT DOCUMENTS

| | | | |
|---|---|---|---|
| 2,817,449 | 12/1957 | Meyer, Jr. et al. | 214/145 R |
| 3,643,821 | 2/1972 | Viel | 214/145 R |
| 3,876,090 | 4/1975 | Holland | 214/766 |
| 3,921,837 | 11/1975 | Vandewater | 214/145 R |
| 3,934,726 | 1/1976 | Martin | 214/131 A |
| 4,015,739 | 4/1977 | Cox | 214/766 |

FOREIGN PATENT DOCUMENTS

| | | | |
|---|---|---|---|
| 265,372 | 7/1963 | Australia | 214/140 |
| 1,264,024 | 5/1961 | France | 214/766 |
| 81,709 | 4/1953 | Norway | 214/766 |

OTHER PUBLICATIONS

Gold'n Spike Bale Carriers, Gold'n Industries.

*Primary Examiner*—Albert J. Makay
*Assistant Examiner*—Ross Weaver
*Attorney, Agent, or Firm*—Clarence A. O'Brien; Harvey B. Jacobson

[57] ABSTRACT

A device for impaling and lifting hay bales consisting of a long, round, pencil-pointed shaft for said purpose plus two shorter shafts of similar design protruding just below and to each side of the main impaling spear for the purpose of stabilizing the bale in the process of loading and handling. This structure is mounted on a rigid steel frame which is designed for attachment to any ordinary hydraulically operated front end loader, or for attachment to any common three-point tractor hitch. Optimum utility is achieved with a tractor having such devices mounted at each end for use at the same time.

5 Claims, 5 Drawing Figures

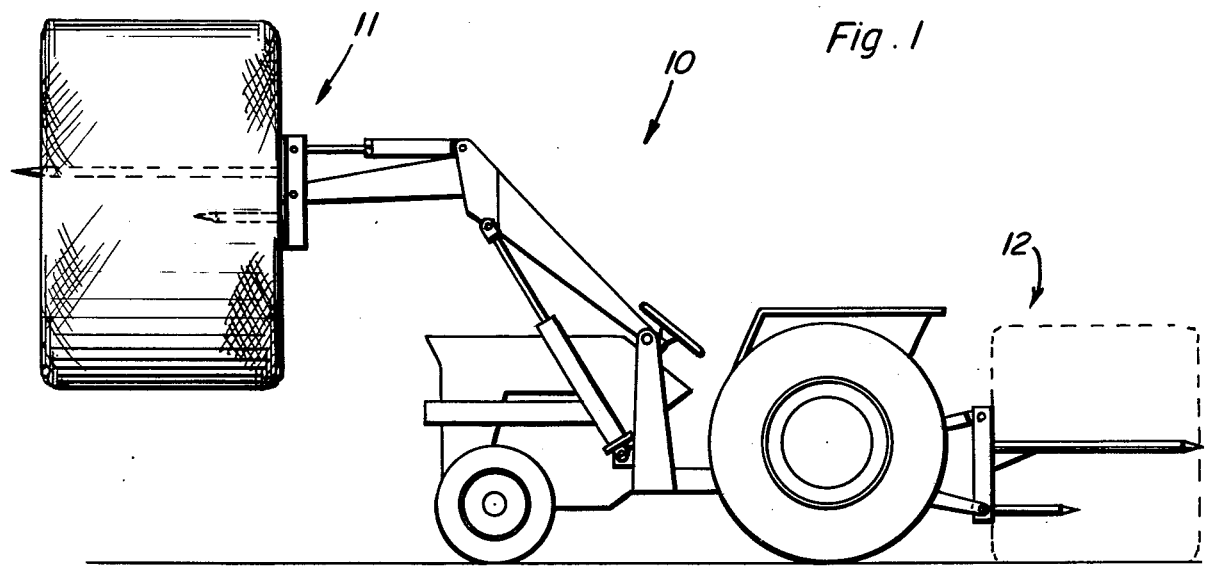
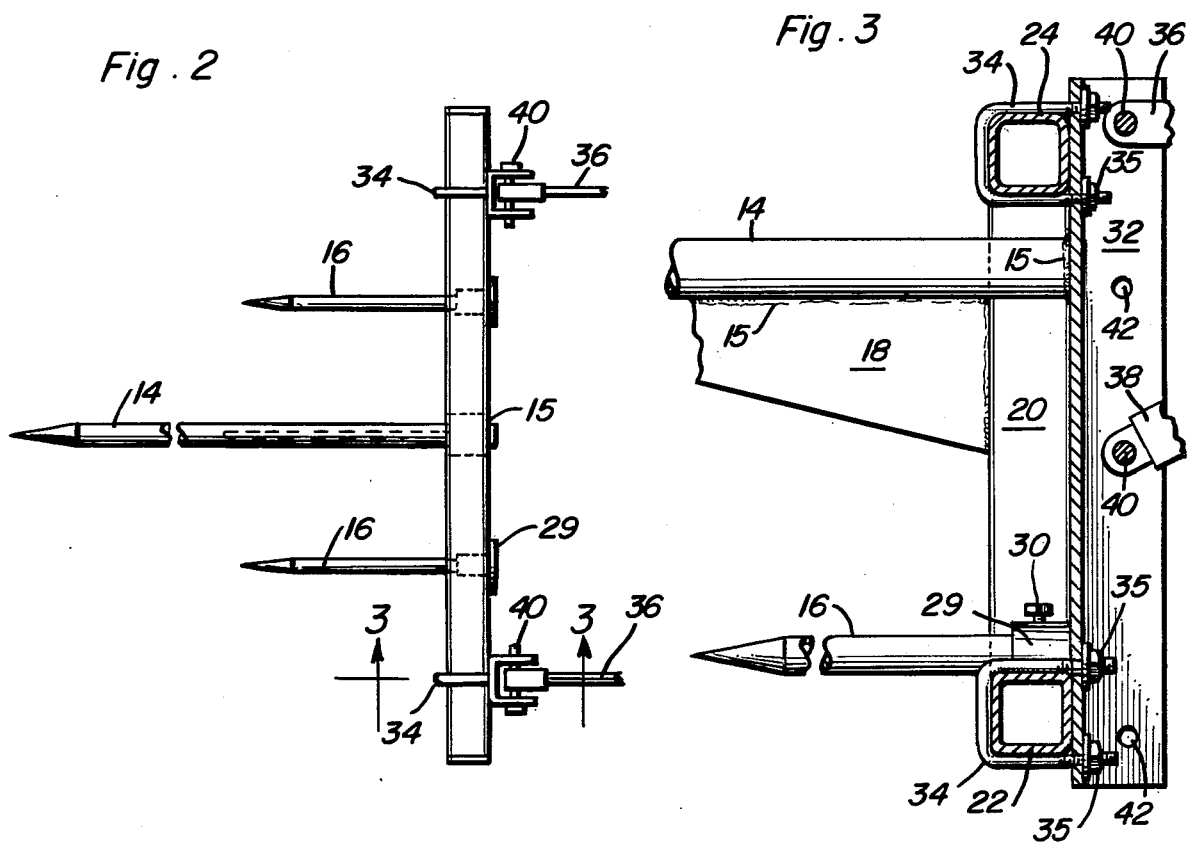

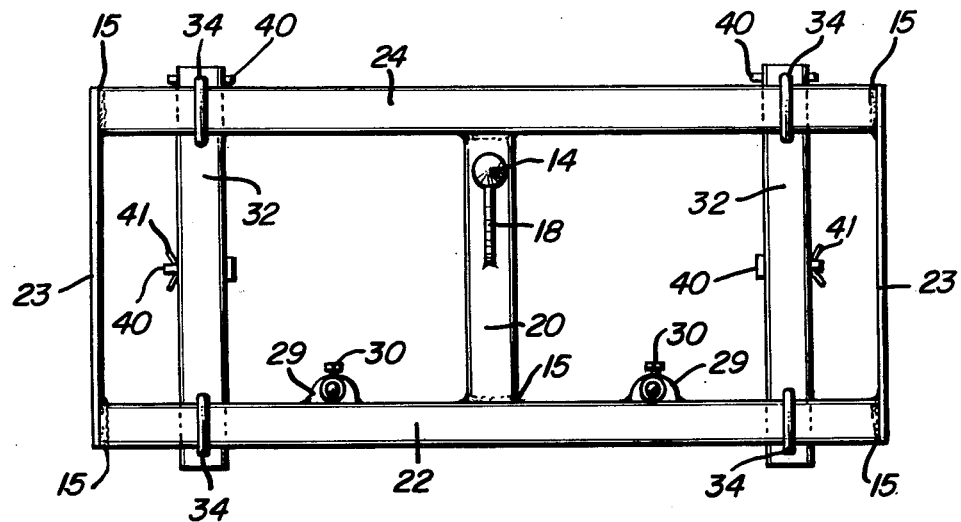
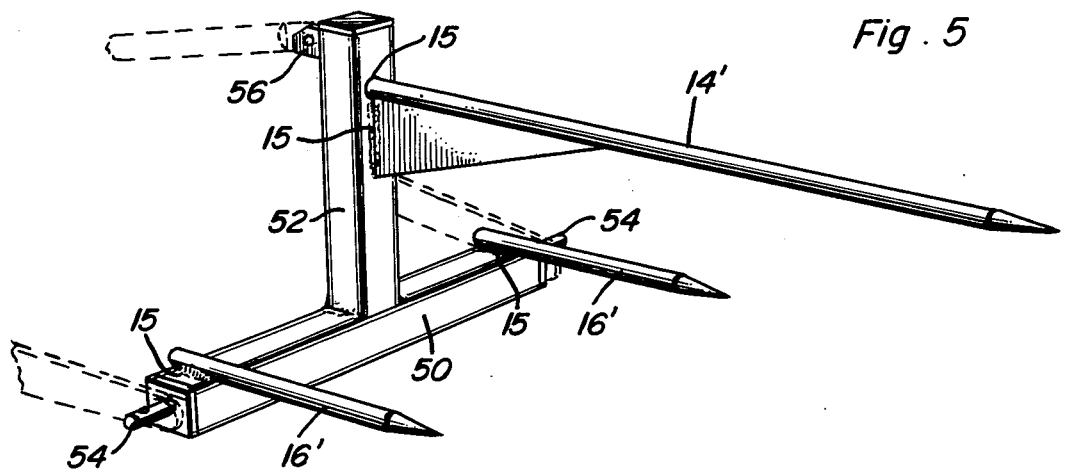

SPEAR-TYPE TRACTOR-ATTACHED HAY BALE PICKUP DEVICE

BACKGROUND OF THE INVENTION

The present invention relates to a hay bale lifter attachment which may be removably attached to either the front operated mechanism of a front end loader, or attached to the three-point hitch of the usual farm tractor.

DESCRIPTION OF THE PRIOR ART

Handling of large, heavy, hay bales has generally been quite a problem for farmers, cattlemen, and others using hay in large quantities and this problem has been aggravated by the recent introduction of machinery which produces a large, very heavy hay bale. None of the devices known in the prior art solve the problem in the simple, yet effective manner of this invention. Lift trucks for moving bulky, heavy loads are known in the art, such as taught by the patents to Ulinski, U.S. Pat. No. 1,545,417; Violette, U.S. Pat. No. 2,684,164; and Smith et al, U.S. Pat. No. 2,698,698.

A device for lifting carpet rolls also is known as taught by Harris, U.S. Pat. No. 3,705,658 and a load handling and engaging device for lift trucks for handling bulk materials is taught by the patent to Garrett, U.S. Pat. No. 2,682,350.

SUMMARY OF THE INVENTION

An object of the present invention is to provide a spear-type hay bale lifter which may be easily attached to farm machinery.

Another object of the present invention is to provide a hay bale lifter having one main lifting spear and two smaller stabilizing spears.

A futher object of this invention is to provide a hay bale lifter which is readily attachable to either the front end mechanism of a front end loader, and/or attached to the three-point hitch at the rear of said tractor.

A still further object of this invention is to provide a tractor having a spear-type hay bale lifter of the type disclosed mounted on the front load mechanism thereof and at the same time having a similar spear-type hay bale lifter mounted on the lift mechanism at the rear thereof.

These and other objects are achieved according to the present invention by providing a spear-type implaing structure which is mounted on a sturdy frame which is readily attachable to either a front mechanism of a front end loader or the three-point hitch at the rear of said tractor. When a tractor is provided with similar units simultaneously an additional advantage is obtained from doubling the carrying capacity, and more importantly the counter-balancing feature. A much smaller tractor may be used because of the counter-balancing effect of the two hay bale lifters than would be used with just one such unit.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a side elevational view showing hay bale lifters according to the present invention mounted on a tractor.

FIG. 2 is a top plan view of the front mounted hay bale lifter.

FIG. 3 is a sectional view taken generally along the line 3—3 of FIG. 2, but drawn to a larger scale.

FIG. 4 is a front plan elevation view of the front mounted hay bale lifter.

FIG. 5 is a perspective view of the rear mounted hay bale lifter.

DESCRIPTION OF THE PREFERRED EMBODIMENT

Referring now more particularly to the drawings, a farm type tractor is indicated in FIG. 1 by reference numeral 10, and a hay bale lifter according to this invention is indicated mounted at the front thereof by reference numeral 11 and a similar hay bale lifter mounted at the rear thereof by reference numeral 12. Almost all farm tractors today have a three-point hitch at the rear thereof which is controllable by the operator in the driver's seat. The device of this invention can almost always be used with a farm tractor in the manner shown by reference numeral 12, i.e., used with the three-point hitch mount. A good many farm tractors also have a hydraulically operated front end loader type mechanism and these tractors may use a hay bale lifter such as shown by reference numeral 11. The basic spear impaling unit is the same for either type mount. The main difference being in the specific support frame and attachments therefor. Additional advantages are obtained by using such units simultaneously at both the front and rear as depicted in FIG. 1.

The basic front end spear-type hay bale lifter is best seen in FIGS. 2, 3 and 4. The main "spear" device consists of a long, round, pencil-pointed shaft 14 which is the primary member for impaling and lifting a large, round hay bale. Two shorter shafts 16 of similar shape, but slightly smaller diameter are also provided for the purpose of stabilizing a bale in the process of loading and handling. A triangular shaped reinforcing and support member 18 is also provided for the main spear 14. This is best seen n FIG. 3 wherein welds 15 for the spear and support member are also indicated.

The main frame consists of horizontal members 22 and 24 separated by a vertical member 20. This frame is in the form of an H which is on its side. These members are made of structural steel and are welded at obvious appropriate points for strength. End plates 23, seen best in FIG. 4, close the open portions of the H and add strength and rigidity to the frame. These plates may be omitted in certain light-load type applications, however in many cases it is desirable that they be included. Reference numeral 15 again indicates appropriate points for welding.

The smaller stabilizing spears 16 may be welded to the lower horizontal frame member 22. However, as shown on the drawings they may be removably mounted in housings 29 welded to frame member 22, and appropriate means such as bolts 30 may be used to secure the spears 16 in their respective mounts. One reason for making these spears removable is because they are low to the ground when the front end mechanism is dropped or the three-point hitch is lowered and therefore they are much more susceptible to being damaged, and/or bent out of proper shape. By making these spears removable and easily replaceable much field maintenance is eliminated. However, as indicated previously, they may be directly welded to the lower frame member if it is desired to keep the initial cost of the overall lifter at a minimum and/or if damage to the lower spears in the field is not a problem.

Since front end loader mechanisms are not completely standardized it is very desirable to make the attachment mounts adjustable so that as many different front end loader mechanisms as possible can be accommodated. This feature of the invention is shown best in FIGS. 3 and 4 wherein adjustable members 32 are shown as being attachable to the main frame by U-bolts 34 having adjustable nuts 35 thereon. Of course, when the U-bolts are loosened, the members 32 can be slid along main frame members 22 and 24 to adjust the spacing for the front end loader mechanism. To attach this invention to a front end loader mechanism the usual bucket of the front end loader is removed, the members 32 are spaced the appropriate distance apart and then arms 36, 38 of the front end loader mechanism are attached to the members 32 by means of holes 42 and pins 40 insertable therein (see FIG. 3). Usual type locking means 41 prevent pins 40 from falling out.

The spear-type hay bale lifter of this invention as arranged for attachment to a three-point hitch is shown in FIG. 5. Here, the main support frame is a simple inverted T arrangement consisting of horizontal member 50 and vertical member 52 with appropriate welds at 15. Each end of main support member 50 has the three-point pin attachments 54 with the upper end of support 52 having the third point attachment 56 thereon. As shown in this configuration the main spear point 14' with support member 18' are again directly welded to the vertical support. The smaller stabilizing spears 16' are also shown as being directly welded to the horizontal member 50. Of course, sockets for removably holding spears 16' similar to 29 having bolts 30 may be substituted for the welds 15.

From the above description it can readily be seen how the novel spear-point hay bale lifter of this invention can be structurally mounted for easy and ready attachment to either the front end mechanism of a usual front end loader tractor and/or mounted for attachment to the usual three-point hitch of the general farm tractor. The flexible attachment means makes the lifter of double utility and also makes it readily adaptable to any type tractor equipment available. Of course with a lifter on both ends of a tractor the utility of the tractor is doubled, that is, two bales may be lifted and carried by the single tractor at the same time. Another most important feature with a double mount is in the counterbalancing effect. Without the hay bale lifter on the rear (with a hay bale impaled thereon) many small tractors would not be able to properly lift a bale at the front without tipping the tractor. Thus by using two of the devices as shown, smaller and lighter tractors may be effectively used. The bales of hay to be speared and lifted as described herein normally weigh upwards of 1500 pounds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A round bale handling attachment for a tractor of the type having a front end loader mechanism which includes a pair of longitudinal pivoted lift arms arranged at opposite sides of the tractor with front end sections projected forwardly of the tractor for normally supporting a bucket which has been detached and removed from the lift arms, said attachment comprising a frame, means on said frame adapted to connect the frame to the front end loader mechanism for movement therewith, an elongated pointed spear rigidly secured to and projecting forwardly from said frame for insertion into the end of a round bale adjacent the center thereof when a bale is on the ground and the tractor is moved forwardly toward said bale, and two shorter pointed spears rigidly secured to and projecting forwardly from said frame, said shorter spears being laterally spaced and parallel to each other, and disposed below said elongated pointed spear with one of said shorter spears being laterally disposed on each side of said elongated spear and combining therewith to provide for a three pointed insertion into the end of said round bale below the center thereof with the elongated spear being inserted completely into the bale and the shorter spear stabilizing the round bale with respect to the elongated spear and frame, when the frame and round bale are elevated by the lift arms of the front end loader mechanism, said frame includes a pair of horizontal, vertically spaced frame members interconnected by a center, vertical frame member rigid with the horizontal frame members, said elongated spear being rigidly connected to the upper end portion of said vertical frame member and said shorter spears being connected to the lower horizontal frame member in spaced relation to either side of the vertical frame member, said elongated spear being provided with a generally triangular gusset plate rigidly connected to the inner end portion of the underside of the elongated spear and the forward surface of the vertical frame member to reinforce the elongated spear and to be inserted into the hay bale to further stabilize the hay bale when the spears are inserted fully into the end of the hay bale, and a pair of vertical, end frame members interconnecting the horizontal frame members, means adjustably interconnecting the end frame members with the horizontal frame members to vary the horizontal distance between the end frame members, said means on said frame adapted to connect the frame to the front end loader mechanism including aperture means and pins extending therethrough in the vertical, end frame members for detachable connection with the front end loader mechanism thereby enabling the frame to be attached to front end loader mechanism having different transverse dimensional characteristics.

2. The structure as defined in claim 1 wherein the lower horizontal frame member includes a pair of sleeves thereon perpendicular to the frame member, the rearmost ends of the shorter pointed spears being received in said sleeves, and means removably securing the shorter spears in said sleeves to enable replacement thereof.

3. The structure as defined in claim 1 in which the tractor also includes a rear mounted three-point hitch, and a round bale handling attachment for the three-point hitch including a frame, means on said frame adapted to connect the frame to the three-point hitch for movement therewith, an elongated pointed spear rigidly secured to and projecting rearwardly from said frame on the three-point hitch for insertion into the end of a round bale adjacent the center thereof when a bale is on the ground and the tractor is moved rearwardly toward said bale, and a shorter pointed spear rigidly secured to and projecting rearwardly from said frame, said shorter spear being disposed below the elongated pointed spear and in parallel relation thereto for insertion into the end of a round bale below the center thereof simultaneously with the insertion of the elongated spear completely into the bale thereby stabilizing the round bale with respect to the frame when the frame and round bale are elevated by the three-point hitch to enable simultaneous handling of two round bales and to counterbalance the weight of the front supported round bale thereby enabling a smaller tractor to be utilized in handling round hay bales, and a second shorter spear attached to said frame in parallel, laterally spaced, aligned relation to the first mentioned shorter spear with the shorter spears being spaced to each side of the elongated spear to provide a three-point insertion into the rear supported round hay bale, said frame including a horizontal bottom frame member and a centrally disposed upstanding frame member, said shorter spears being rigidly secured to the bottom frame member, said elongated spear being rigidly secured to the vertical frame member adjacent the upper end thereof and being provided with a triangular reinforcing gusset at the inner end thereof for reinforcing the elongated spear and further stabilizing the rear mounted round hay bale when the spears are completely inserted therein, said means on said frame to connect the frame to the three-point hitch including a pin extending axially outwardly from each end of the horizontal bottom frame member and forwardly projecting lug means adjacent the upper end of the upstanding frame member.

4. A round bale handling attachment for a tractor of the type having a front end loader mechanism which includes a pair of longitudinal pivoted lift arms arranged at opposite sides of the tractor with front end sections projected forwardly of the tractor for normally supporting a bucket which has been detached and removed from the lift arms, said attachment comprising a frame, means on said frame adapted to connect the frame to the front end loader mechanism for movement therewith, an elongated pointed spear rigidly secured to and projecting forwardly from said frame for insertion into the end of a round bale adjacent the center thereof when a bale is on the ground and the tractor is moved forwardly toward said bale, and two shorter pointed spears rigidly secured to and projecting forwardly from said frame, said shorter spears being laterally spaced and parallel to each other and disposed below said elongated pointed spear with one of said shorter spears being laterally disposed on each side of said elongated spear and combining therewith to provide for a three-pointed insertion into the end of a round bale below the center thereof with the elongated spear being inserted completely into the bale and a shorter spear stabilizing the round bale with respect to the elongated spear and frame when the frame and round bale are elevated by the lift arms of the front end loader mechanism, said frame includes a pair of horizontal, vertically spaced frame members interconnected by a center, vertical frame member rigid with the horizontal frame members, said elongated spear being rigidly connected to the upper end portion of said vertical frame member and said shorter spears being connected to the lower horizontal frame member in spaced relation to either side of the vertical frame member, and a pair of vertical, end frame members interconnecting the horizontal frame members, means adjustably interconnecting the end frame members with the horizontal frame members to vary the horizontal distance between the end frame members, said means on said frame adapted to connect the frame to the front end loader mechanism including aperture means and pins extending therethrough in the vertical, end frame members for detachable connection with the front end loader mechanism thereby enabling the frame to be attached to front end loader mechanisms having different transverse dimensional characteristics.

5. A bale handling device for use with a tractor for lifting large roll-type bales comprising: a frame means having one vertical and two horizontal members with the horizontal members securely attached at the top and bottom of said vertical member, securing means for securing said frame to said tractor consisting of two vertical securing bars each of which is slidably attached to each of the horizontal members with one of said securing bars on each side of said vertical member, with each of said securing bars having attachment means in the center thereof for attachment to said tractor, an elongated pointed spear rigidly secured to and projecting forwardly from said frame for insertion into the end of a round bale adjacent the center thereof when the bale is on the ground, a shorter pointed spear detachably secured to and projecting forwardly from said frame, said shorter spear being disposed below the elongated pointed spear and in parallel relation thereto for insertion into the end of a round bale below the center thereof.

* * * * *